Oct. 17, 1967 W. STOCK 3,347,156
APPARATUS FOR PREPARING A TRUSSED BONED FOWL PORTION
Original Filed Dec. 14, 1962 3 Sheets-Sheet 1
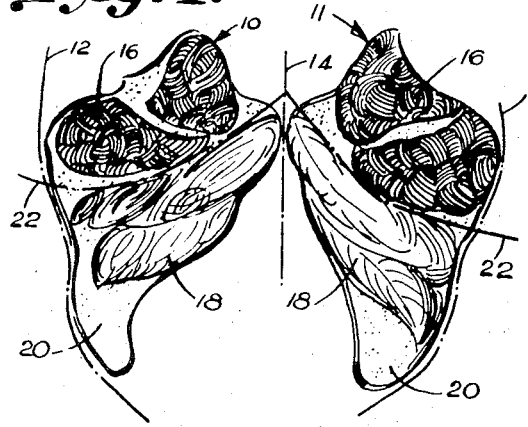
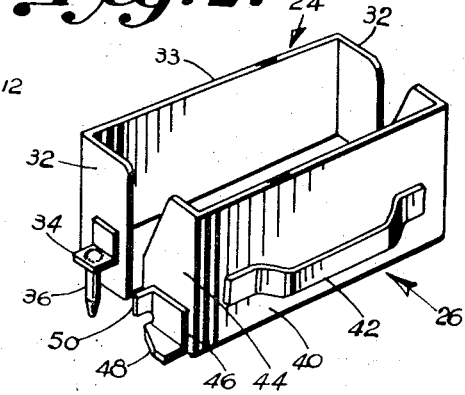
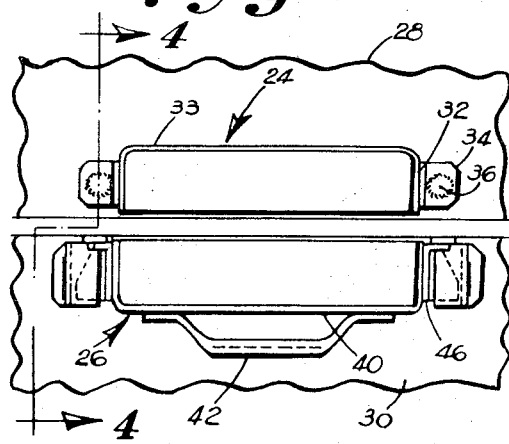
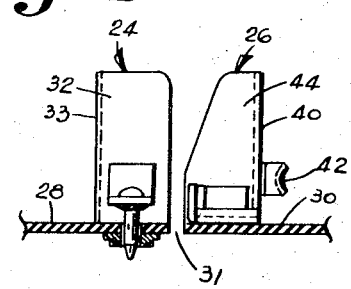
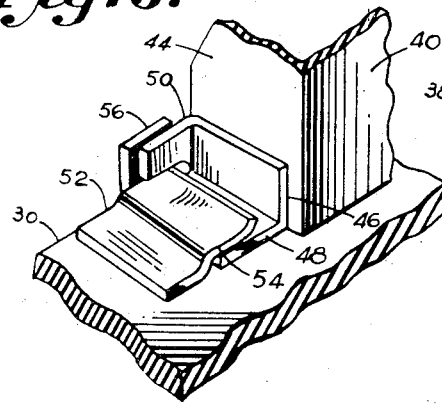
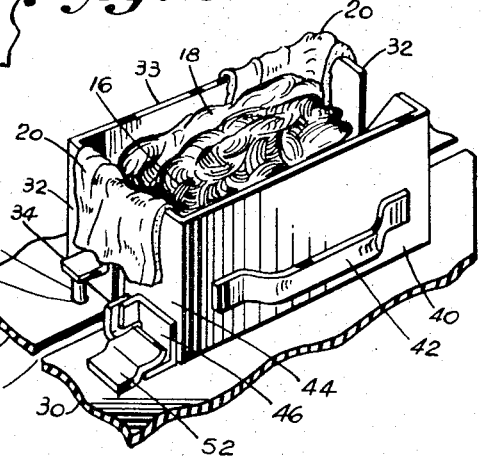
INVENTOR.
WERNER STOCK
BY
*ATTORNEY*

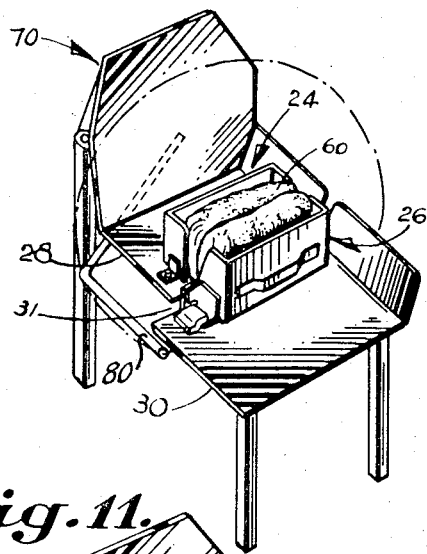
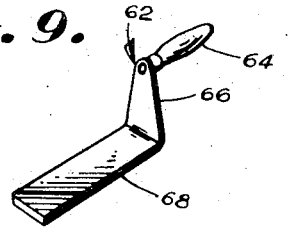
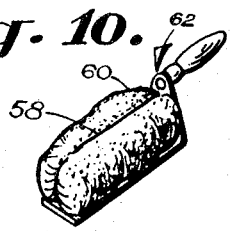
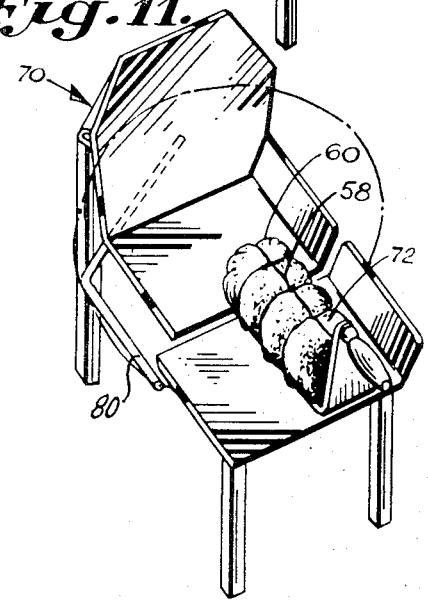
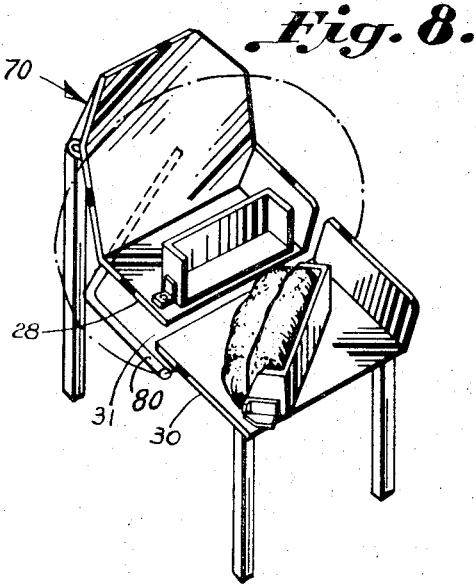
INVENTOR.
WERNER STOCK

Oct. 17, 1967 W. STOCK 3,347,156
APPARATUS FOR PREPARING A TRUSSED BONED FOWL PORTION
Original Filed Dec. 14, 1962 3 Sheets-Sheet 3

INVENTOR.
WERNER STOCK
BY
ATTORNEY

United States Patent Office 3,347,156
Patented Oct. 17, 1967

3,347,156
APPARATUS FOR PREPARING A TRUSSED
BONED FOWL PORTION
Werner Stock, Park Forest, Ill., assignor to Union
Carbide Corporation, a corporation of New York
Original application Dec. 14, 1962, Ser. No. 244,719, now
Patent No. 3,268,343, dated Aug. 23, 1966. Divided
and this application Oct. 23, 1965, Ser. No. 511,016
3 Claims. (Cl. 100—7)

This is a division of application Ser. No. 244,719 filed Dec. 14, 1962, now U.S. Patent 3,268,343, issued Aug. 23, 1966.

This invention relates to the preparation and packaging of boneless fowl for roasting. More particularly, the invention is concerned with preparing a controlled portion of a dressed, eviscerated, boned turkey using discrete pieces of skin-attached meat to make a firm, durable roll of skin-overwrapped meat suitable for roasting, compacted and encased by an elastic film pouch into a substantially cylindrical package suitable for freezing.

Former methods of preparing and packaging boneless trussed up turkey rolls in plastic bags required a large amount of hand labor and resulted in non-uniform items.

Boneless turkey rolls suitable for roasting by the consumer were formerly prepared by removing the neck, wings and legs of a dressed, eviscerated turkey of about 18 to 22 pounds weight; dividing into equal half-portions the bird's skin, breast and dark meat, draping the skin into a pan in which there was first laid a plurality of spaced lengths of twine across and along the pan floor and walls and uniformly layering of the white meat and dark meat pieces of a portion of the whole fowl therein, then shaping into a roll by wrapping the skin about the meat and manually trussing up the roll with butcher twine using at least three circumferential and one longitudinal ties. This method of preparing and trussing a turkey roll for roasting, and packaging the trussed roll in plastic bags for freezing required considerable manual labor and resulted in a relatively non-uniform packaged poultry item.

It is an object of this invention to provide an apparatus for forming and packaging discrete pieces of boneless poultry into a firm, trussed up, skin-overwrapped cylindrical shape suitable for roasting.

It is an additional object of this invention to provide an improved apparatus for economically shaping, trussing up and encasing in an elastic bag a boneless turkey roast.

Other and additional objects will become apparent from the following description and accompanying drawings.

One embodiment of the invention comprises preparing a boneless turkey roast by removing the neck, legs and wings from a dressed, eviscerated turkey, removing frame bones and other inedible material and dividing the edible meat and attached skin into predetermined portions and uniformly layering and forming pieces of the portion's white meat and dark meat into a skin-overwrapped roll while the meat is encompassed in a split open top chamber and therein machine trussing the roll with twine about its longitudinal axis; then removing the longitudinally tied roll from the chamber on to the blade of an offset spatula, the longitudinal axes of the roll and blade being held in substantially parallel relationship while machine trussing the roll thus positioned on the blade about the transverse axes of the roll and the spatula tie-combined with a plurality of spaced twine ties; then encasing the spatula supported roll in an elastic film pouch and withdrawing the spatula blade from the transverse ties about the item, then gathering and closing the pouch with a suitable fastening and freezing the encased trussed poultry roll roast.

An important feature of this invention providing a more efficient apparatus for making and packaging rolled turkey roast items, is the means that result in an economical method and a more uniform product permitting the use of commonly used twine tying apparatus adapted to trussing loose meat portions and the use of supplementary bag enveloping apparatus.

One embodiment described with particular reference to preparing a turkey roll involves the steps of:

A. Boning and removing neck, wings, legs and inedible portions of a dressed, eviscerated turkey of about 18 to 22 pounds weight and dividing the skin and meat into equal half-portions and then into discrete pieces of skin-attached white meat and dark meat.

B. Providing a split open top forming chamber, the inside dimensions of which approximate the size of turkey roll desired. A half-section trough of the chamber is removably fastened to the distal (rear) operating surface of a commercial meat roll type of package tying machine, with the chamber section's longitudinal axis adjacent and parallel to the machine tying axis. The distal (rear) half-section of the forming chamber is used in fixed position. The proximal mating half-section trough of the forming chamber is slidably aligned with the distal trough of the chamber and frictionally secured on the proximal (front) surface of the tying machine and is spaced from the machine tying axis a distance of about ¼". A discrete piece of skin-attached meat of the boned turkey half-portion is loosely placed on the bottom of the chamber formed by the assembled two troughs comprising the forming chamber with the skin side down and with extend portions of the skin draped over the walls of the chamber. Loose pieces of white and dark meat are then arranged in layers into the skin draped therein, and after another piece of skin-attached meat is laid on top with the skin side up, the skin is pulled about the meat and the mass is shaped into a roughly formed roll. The proximal trough of the forming chamber is secured in position either by frictional locking means or by hand, thereby supporting and maintaining by the chamber's walls and bottom the shape of the skin-overwrapped meat roll, concurrently as the roll is machine tied with butcher twine about its longitudinal axis.

C. The movable (proximal) trough of the forming chamber and contained longitudinally tied meat roll are mutually moved apart from the fixed (distal) trough by disengaging the frictional securing means, and thus enabling the longitudinally tied meat roll to be removed from the trough on to the longitudinal axis of the blade of an offset spatula supporting the length of the meat roll. The longitudinally tied meat roll is transferred on the spatula blade to a second tying machine and while the longitudinal axes of the roll and blade are maintained in parallel relationship, at least three equally spaced transverse circumferential twine ties are made about the roll tie-combining it with the supporting blade of the spatula.

D. The turkey roll remains tie-combined to the spatula blade and is thereby transferred to a bag stretching apparatus and is thus readily inserted into an elastic film pouch expanded thereon, and the entire assembly removed from the stretching apparatus. The blade of the spatula is then withdrawn from the twine ties of the encased tied turkey roast. The elastic film pouch top is gathered about the end of the turkey roll as by twisting, and is closed by heat-sealing the film or by applying pressure sensitive tape or a metal wire or metal clip closure; and the package is then frozen.

Referring to the drawings:

FIGURE 1 is a top plan view, from the inside out, of the two half-portions comprising only the edible portions of a turkey, with skin attached, unroled and flattened onto a surface with the skin down. The neck, legs, wings and frame bones have been removed.

FIGURE 2 is a perspective of the front and rear rectangular sheet metal troughs comprising a split open top forming chamber.

FIGURE 3 is a top plan view of the front and rear troughs comprising a split open top forming chamber, positioned respectively on the front and rear operating surfaces adjacent the twine tying passage of an automatic package tying machine.

FIGURE 4 is a section taken along line 4—4 of FIGURE 3.

FIGURE 5 is an enlarged perspective of a portion of the left end of the front trough of the split forming chamber shown in FIGURE 2, showing in more detail the tongue and slide detent means for positioning the front trough on the front operating surface adjacent one side of a twine tying passage of an automatic package tying machine.

FIGURE 6 is a perspective of the split forming chamber shown in FIGURE 2, with pieces of skin-attached meat of a half-portion of a boned turkey with extended skin portions draped over the chamber side and end walls, and the discrete pieces of white and dark meat being uniformly disposed over the chamber bottom.

FIGURE 7 is a schematic perspective of an automatic package tying machine with a split open top forming chamber arranged about a twine tying passage on its front and rear working surfaces, and pieces of skin-attached meat of a half-portion of a boned turkey laid therein and formed into a skin-overwrapped roll of white and dark meat.

FIGURE 8 is a schematic perspective of the automatic package tying machine of FIGURE 7 showing the front trough of the forming chamber removed from the twine tying passage with a longitudinal twine tied skin-overwrapped turkey roll contained therein.

FIGURE 9 is a perspective of a spatula with a blade offset to the handle that is used to support the longitudinal tied turkey roll in removing it from the forming chamber trough to a second tying machine.

FIGURE 10 is a perspective of the offset spatula shown in FIGURE 9, with the longitudinal tied turkey roll on its supporting blade.

FIGURE 11 is a schematic perspective of the automatic package tying machine of FIGURE 7 with the spatula-supported boneless turkey roll after three transverse twine ties have been made about the roll and blade of the spatula.

Figure 12:
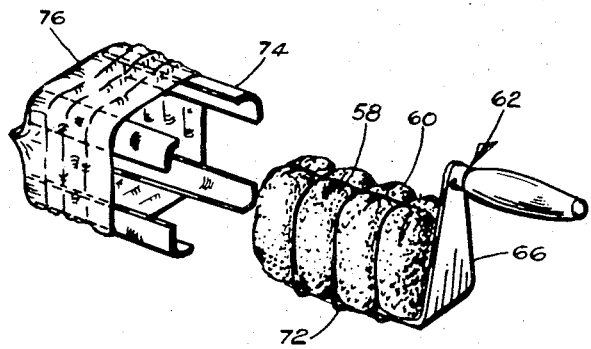
FIGURE 12 is a perspective of a finger-stretched elastic film bag showing the step preparatory to inserting the spatula-supported tied boneless turkey roll roast into the stretching fingers to the bag's bottom and removing the bag enveloped roll from the fingers.

Referring now to the drawings in which like reference numerals designate like parts, and with particular reference to FIGURE 1 there is shown a dressed and eviscerated fresh turkey with the neck, wings and legs removed. The whole turkey has been cut along line 12 at the ventral or breast bone, away from the frame bones of the fowl with as much meat attached to skin as possible. Other inedible portions have been removed and the meat mass is laid out flat with the attached skin portion down. The left half-portion 10 and right half-portion 11 of the boned meat and skin are cut apart into pieces at the dorsal line 14, and the half-portions each are cut apart at line 22 into discrete pieces of skin-attached dark meat 16 and white meat 18.

Referring now to FIGURES 2, 3, 4, 5, a rectangular split open top forming chamber is made of two separable half-section troughs 24, 26, of sheet metal such as stainless steel, each trough having two end walls, one side wall and a bottom wall.

The forming chamber rear trough 24 and front trough 26 are juxtaposed in a horizontal plane on operating surfaces, such as rear surface 28 and front surface 30 spaced about twine tying passage 31 of automatic package tying apparatus shown generally as 70 in FIGURES 7, 8 and 11 and of a type similar to that described and disclosed in U.S. Patent 2,274,525 and U.S. Patent 2,462,957. The package tying apparatus 70 shown schematically, is one of a class of commercial apparatus commonly sold for tying packages, red meat rolls, etc., with cotton twine; by circumaxially passing a shuttle arm 80 about the item thereby paying out and tightening a bight of twine in a passage about the item and securing it with a knot.

The rear trough 24 of the composite forming chamber has attached on each outside surface of end walls 32, an angle clip 34 to which is vertically fastened pilot pin 36. Flanged holes 38 are positioned in the rear operating surface 28 of tying machine 70 to receive pilot pins 36 and locate the edge of trough 24 bottom wall adjacent to the twine tying passage 31 wherein the bight of twine is passed when the item is tied, as later described.

The front trough 26 of the forming chamber has attached on the outside surface of its front wall 40 a metal handle 42 and on each outside surface of end walls 44 has attached an angle clip 46 that has an outwardly projecting tongue 48 and stop surface 50. Groove detents 52 having slide surface 54 and upstanding stop surface 56 are fastened on to the top of the front operating surface 30 and positioned thereon to slidably cooperate with tongues 48 and thereby align and frictionally secure trough 26 opposite trough 24, spacing it therefrom by the width of twine tying passage 31.

The composite forming chamber assembled on operating surfaces 28 and 30, comprised of rear trough 24 and removable trough 26, is used to shape predetermined portions of a cut up turkey of about 20 pounds weight such as right one-half portion 11 of the meat shown in FIGURE 1, by shaping it into a skin-overwrapped roll of about 4¼ inches in diameter by 8½ inches in length. Refer now to FIGURE 6, wherein white meat 18 is first laid into the chamber with the skin side down and the neck flap of skin 20 draped over part of rear wall 33 and end wall 32. Dark meat 16 with skin 20 (skin side up) and supplemental cuts of white and dark meat are nested onto the white meat 18 and the skin flaps are pulled about the meat cuts to form a cylindrical skin-overwrapped roll. While the skin-overwrapped roll is retained by the walls of the forming chamber the twine tying apparatus is actuated to pass a bight of twine in passage 31 longitudinally about the meat roll 60 and secure the longitudinal twine tie 58 with a knot.

Refer now to FIGURES 8 to 11. Handle 42 of trough 26 is pulled forward to disengage trough 26 and its contained meat roll 60 from groove detents 52. Trough 26 and meat roll 60 contained therein is pulled toward the operator along front surface 30 separating it from trough 24. An offset spatula shown generally as 62, has a handle 64, a vertical shoulder portion 66, and a blade 68. The blade 68 preferably is a predetermined width of about 33% to 66% of meat roll 60 diameter. Meat roll 60 is rolled from trough 26 onto blade 68 of spatula 62, and is positioned endwise in contact with shoulder 66 thereof, and transported by hand to the front operating surface of the tying machine shown schematically in FIGURE 11 and designated generally as 70. Tying machine 70 is used to truss the meat roll 60 with three or more equally spaced circumferential twine ties 72, that are made transversely about the axis of roll 60 and the blade 68 of spatula 62.

As shown in FIGURE 12, the trussed turkey roll 60 tied by transverse ties 72 to blade 68 of spatula 62, is transferred to the open end of a bag stretching apparatus shown schematically by curved fingers 74 on which is stretched an elastic film bag 76. The bag 76 whose normal unstretched perimeter is smaller than the maximum perimeter of the turkey roll item 60 transverse to its major axis, is simultaneously elastically stretched circumferentially along substantially its entire length by the fingers of the stretching apparatus 74 to a larger perimeter than the turkey roll. The turkey roll 60 and spatula blade 68 are advanced to the bag bottom to strip the bag from the stretching fingers 74.

Figure 13:
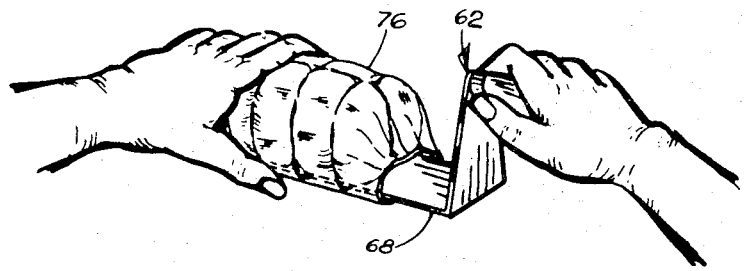
FIGURE 13 is a perspective of an elastic bag-enveloped spatula-supported tied boneless turkey roll roast showing the step of withdrawing the spatula blade from the ties and bag, retaining the roll in the bag's bottom.

Refer now to FIGURE 13. The blade 68 of the spatula is then withdrawn from between the encased meat roll 60 and twine ties 72 by restraining the roll 60 in the bag bottom. After stripping from the stretching fingers, the released stretched elastic bag 76 attempts to return to its unstretched perimeter, thereby shrinking snugly down about the encased turkey roll 60.

The elastic bag top is snugly gathered about the end of roll 60 by hand, and a closure such as a heat seal or preferably a fastening such as a commonly used metal clip is applied thereto. The bag walls continue to shrink further to snugly encompass and compact the meat mass in the meat roll thereby further compressing the individual cuts to yield a firm durable item suitable for freezing.

The following is an illustrative example of the operation of the preferred embodiment of the apparatus.

A dressed, eviscerated turkey weighing about 20 pounds that has had removed therefrom its neck, legs, wings and inedible parts, is cut into half-portions 10, 11 of meat and skin as shown in FIGURE 1. Each half-portion 10, 11 flattens out roughly into a triangular shape about 18 inches long and 9 inches wide weighing 4 to 5 pounds. A half-portion 11, of white meat, dark meat and skin weighing about 4½ pounds can by the method of this invention, be skin-overwrapped and twine trussed into a commercially desirable meat roll roast 60 of 4¼ inches diameter and 8½ inches length using a split open top forming chamber of 9 inches inside length, 4½ inches inside width and 2½ inches height comprised of two separable smooth metal troughs made of stainless steel or other sanitary material. A suitable spatula 62 for the transverse trussing and flexible bag enveloping of meat roll 60, has a blade 2 inches wide by 8 inches long of 20 gauge stainless steel, with a 5 inch offset between blade and handle. The preferred elastic film bag for this size meat roll is a 6 inch flat width (12 inch circumference) by 18 inches in length Visten pouch bag (of seamless plasticized polyvinyl chloride film) that is finger stretched from its normal 12 inch perimeter to a perimeter about 30% greater such as about 15½ inches for longitudinally receiving the trussed turkey meat roll. After removing the trussed meat roll 60 and spatula 62 from the stretching means 74 the bag open end is snugly gathered about the meat roll item and closed with a suitable tie or metal clip closure. It is highly desirable that the encased meat roll is frozen in less than 90 minutes after the elastic film bag shrinks snugly about the meat roll item, in order to prevent an unsightly accumulation of meat juices between the bag walls and meat roll surfaces adjacent the ties.

An important feature of the herein described method of making a turkey meat roll, is the formation of relatively uniform size, shape and weight rolls of compacted edible skin-overwrapped turkey parts that may be frozen with a substantial part of the meat juices retained therein and which is suitable for roasting.

As used herein, the term "film" is not necessarily limited to but includes; plasticized polyvinyl chloride films; synthetic rubber film; cellulosic film; polyolefin films such as polyethylene and polypropylene, and the like; and also heat-shrinkable films wherein the product is loosely enveloped therein and in a susbequent step is subject to heat thereby to shrink the film snugly about the product items.

The principles of this invention are not restricted to the formation and packaging of turkey rolls, but are also applicable to the film packaging of other poultry items such as eviscerated and boned ducks, geese, chickens and other food items wherein it is desirable to package a flabby indiscriminately shaped item into a compact, firm durable surface-prepared item suitable for cooking.

Since it is obvious that various changes and modifications can be made in the above description without departing from the nature and spirit thereof, this invention is not restricted thereto except as set forth in the appended claims.

What is claimed is:

1. In an apparatus for tying meat rolls, the combination of:
    (a) an automatic tying machine having flat, horizontal surfaces and equipped with tying means having a twine carrying arm;
    (b) split troughs positioned and adapted to be secured on to said flat, horizontal surfaces;
    (c) a passage defined between the split troughs and said surfaces positioned in the path of said twine carrying arm so that a meat roll positioned therein can first be tied longitudinally and subsequently be tied transversely;
    (d) spatula means to support a meat roll substantially along only the longitudinal axis of said meat roll such that said twine-carrying arm of said tying means transversely ties a meat roll while supported on said spatula means.

2. In an apparatus for tying meat rolls with twine, the combination of:
    (a) an automatic package tying machine having flat, horizontal surfaces and equipped with twine tying means having a twine carrying arm;
    (b) split troughs positioned and adapted to be aligned and separately secured on to said flat, horizontal surfaces, said split troughs having walls and bottoms proportioned to confine a meat roll therein;
    (c) a passage defined between said flat surfaces and said split troughs and positioned in the path of said twine carrying arm so that a meat roll positioned therein can first be tied longitudinally and subsequently be tied transversely;
    (d) spatula means to support a meat roll substantially along only the longitudinal axis of said meat roll such that said twine carrying arm of said tying means transversely ties a meat roll about said supporting spatula means while said meat roll is positioned thereon and said spatula means can subsequently be withdrawn while said transverse ties are retained about said meat roll.

3. In an apparatus for tying meat rolls with twine, the combination of:
    (a) an automatic package tying machine having flat, horizontal surfaces and equipped with twine tying means having a twine carrying arm;
    (b) a split chamber comprising two spaced troughs troughs positioned and adapted to be secured onto said flat, horizontal surfaces, the walls, bottoms and spacing of said spaced troughs being proportioned to support a meat roll positioned therein;

(c) a passage defined between said spaced troughs and positioned in the path of said twine carrying arm so that a meat roll positioned therein can first be tied longitudinally and then be tied transversely;

(d) spatula means to support a meat roll substantially along only the longitudinal axis of said meat roll such that said twine carrying arm of said tying means transversely ties a meat roll about said supporting spatula means while said meat roll is positioned thereon and said spatula means can subsequently be withdrawn while said transverse ties are retained about said meat roll.

References Cited

UNITED STATES PATENTS

| | | | |
|---|---|---|---|
| 225,467 | 3/1880 | Detwiler. | |
| 261,984 | 8/1882 | Baxter | 100—1 |
| 2,242,246 | 5/1941 | Flett | 100—8 X |
| 2,987,990 | 6/1961 | Mazza. | |
| 3,019,722 | 2/1962 | Gum | 100—1 |
| 3,082,682 | 3/1963 | Kaufman | 100—3 |

BILLY J. WILHITE, *Primary Examiner.*